United States Patent [19]
Dannals

[11] 3,859,260
[45] Jan. 7, 1975

[54] OLIGOMERS

[76] Inventor: Leland E. Dannals, 34 Split Rock Dr., Waterbury, Conn. 06706

[22] Filed: Aug. 22, 1973

[21] Appl. No.: 390,472

Related U.S. Application Data

[60] Continuation of Ser. No. 181,634, Sept. 17, 1971, abandoned, which is a division of Ser. No. 674,737, Oct. 12, 1967, Pat. No. 3,646,099.

[52] U.S. Cl. ... 260/79.3 R, 252/500, 260/79.3 MU, 260/465.4, 260/481 R
[51] Int. Cl. .......................... C08f 3/92, C08g 33/00
[58] Field of Search... 260/79.3 MU, 79.3 R, 481 R, 260/465.4; 252/500

[56] References Cited
UNITED STATES PATENTS

| | | | |
|---|---|---|---|
| 2,883,369 | 4/1959 | Rees | 260/79.3 R |
| 3,128,298 | 4/1964 | Lefevre et al. | 260/458 |
| 3,498,942 | 3/1970 | Dannals | 260/29.6 R |
| 3,498,943 | 3/1970 | Dannals | 260/29.6 R |
| 3,646,099 | 2/1972 | Dannals | 260/465.4 |
| 3,792,027 | 2/1974 | Panzer et al. | 260/79.3 R |

*Primary Examiner*—Ronald W. Griffin
*Attorney, Agent, or Firm*—Willard R. Sprowls, Esq.

[57] ABSTRACT

The invention relates to a polymerization process employing a bisulfite salt as the initiator and the bisulfite terminated oligomers formed thereby. The oligomers and their salts are useful as conductive agents.

5 Claims, No Drawings

OLIGOMERS

This is a continuation of application Ser. No. 181,634, filed Sept. 17, 1971, now abandoned, which, in turn, was a division of application Ser. No. 674,737, filed Oct. 12, 1967, now U.S. Pat. No. 3,646,099.

This invention relates to a new and improved method of polymerization and the oligomers produced thereby. More specifically, the invention teaches an aqueous reductive polymerization technique which employs a bisulfite reducing agent and the low molecular weight products of the reaction.

Conventionally, free radical redox polymerization is conducted with an oxidative initiator, such as hydrogen, alkyl, or acyl peroxides, persulfates, or hydroperoxides, and a reductive activator, such as $NaHSO_3$, $Na_2S_2O_3$, $Na_2S_2O_4$, or sodium formaldehyde sulfoxylate. The oxidative initiator is used in much larger amounts than the reductive activator, and the former is part of the original charge while the latter may be part of the original charge or may be added incrementally during the polymerization. For the discussion herein, this practice shall be called "oxidative polymerization".

In the instant invention, the material added first and in much larger amounts, i.e., the initiator, is a reducing chemical, specifically, a bisulfite salt, e.g., $NaHSO_3$, while the material added during the polymerization, in smaller amounts, i.e., the activator, is an oxidizing chemical, e.g., $(NH_4)_2S_2O_8$. This procedure is referred to herein as "reductive polymerization".

Reductive polymerization, in contrast to the techniques of the prior art, facilitates the preparation of oligomers having a comparatively low and accurately regulated degree of polymerization. If the molecular weight is not limited, the reaction product would become too viscous to employ liquid product techniques in manufacture and use. Thus temperature control would be lost because of poor agitation; it would be difficult or impossible to drain or pump the reaction product from the vessel in which it was made to the container in which it is sent to the customer without losing material through hold-up. The customer would face similar hold-up and would find application unsatisfactory in equipment designed to handle fluids.

The products thus formed by reductive polymerization have been found to have surprisingly useful properties as contrasted to higher molecular weight materials conventionally obtained by oxidative polymerization.

Generally, the average molecule of the oligomers may be represented by the following formula:

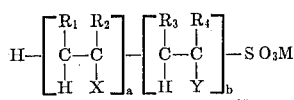

it being understood that the formula is not intended to depict the actual structure of the final compounds, because the structural units;

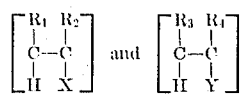

are randomly distributed in the molecule.

In the above generic formula, M is a water soluble cation of the bisulfite salt, $R_1$, $R_2$, $R_3$ and $R_4$ are hydrogen, methyl or ethyl, Y is one or more hydrophillic groups which, when attached to a vinyl group, form a water soluble homopolymer, viz.,

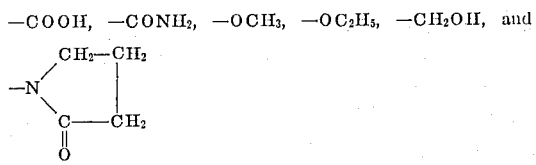

and X is one or more hydrophobic groups which, when attached to a vinyl group, form a water insoluble homopolymer, viz., $-COOC_2H_4OH$, $-COOC_3H_6OH$, $-CONHCH_2OH$, $-CONHCH_3$, $-CONHC_2H_5$, $-CONHC_3H_7$, $-CONHC_8H_{17}$, $-COOCH_3$, $-COOC_2H_5$, $-CN$, $-OOCH_3$, $-OOCC_2H_5$, or $-CONHC(CH_3)_2-CH_2COCH_3$.

With respect to the water solubility of the homopolymers discussed above, in the preferred instances, a water soluble homopolymer is one having a water solubility greater than 10 percent, and a water insoluble homopolymer is one having a water solubility of less than 10 percent.

Since the oligomers of the instant invention, or their salts must be soluble in water, there must always be at least one hydrophillic group, Y, present, but there need not be a hydrophobic group, X.

The subscript a used in the above formula represents the total moles of the hydrophobic group or groups per molecule and the subscript b the total moles of the hydrophillic group or groups per molecule. The degree of polymerization, $a + b$, is broadly between 4 and 250, preferably between 10 and 100. The mole fraction of the monomer having the X functional group $a/a+b$, may vary from 0.0 – 0.6, preferably the mole fraction must be less than 0.4, most desirably, less than 0.3, but the limit on this value will vary with the particular hydrophobic group, and should not be so large that a macrophase of sticky polymer is formed. The reason for this restriction is exposed below. The ratio of $a$ to $b$ may be varied as desired by those skilled in the art, depending, most importantly, on the desired water solubility of the oligomer or its salts.

Thus for an oligomer having the formula: H-(acrylonitrile)$_a$-(acrylic acid)$_b$—$SO_3Na$, at an $a + b$ value of 20 or greater, the value of $a/(a + b)$ should be less than 0.32 but preferably less than 0.25. If $a + b$ is 16 or less, the value of $a/(a + b)$ can be as large as 0.5.

But for the oligomer, H-(methyl acrylate)$_a$-(acrylic acid)$_b$—$SO_3Na$, on the other hand, at $a + b = 20$, the limit on $a/(a + b)$ is between 0.3 and 0.4.

To summarize: in H—(X)$_a$-(acrylic acid)$_b$—$SO_3Na$,

| X | a + b | a/(a + b) maximum |
|---|---|---|
| Acrylonitrile | 20 or larger | 0.32-0.25 |
| Acrylonitrile | 16 or less | 0.5 or more |
| Methyl Acrylate | 20 | 0.4-0.3 |
| Isodecyl Acrylate | 15 | less than 0.067 |
| N-isooctyl Acrylamide | 21 | About 0.05 |
| 2-ethylhexyl Acrylate | 15 | less than 0.05 |
| Ethyl Acrylate | 20 | About 0.2 |
| Hydroxypropyl Acrylate | 20 | Between 0.5 and 0.25 |
| Methoxyethyl Acrylate | 20 | less than 0.25 |

Hence each monomer, particularly those with hydrophobic groups, must be considered separately, and the broad and preferred ranges determined. The oligomers contain only a trace of unreacted $SO_2$ or of unreacted bisulfite reducing agent.

The reductive polymerization of the invention may be performed with a wide variety of alpha, beta-double-bonded monomers having a hydrophillic group. A mixture of such monomers, or one or more of such monomers in conjunction with still another monomer which has a hydrophobic group, may be used. The monomers employed genrally have a water solubility of at least 1 percent by weight at 24°C.

The polymerization can be run to produce either (1) a clear, one phase product, or (2) a hazy or milky two phase product which can be agitated, kept in temperature control, and made clear upon neutralization of any acid groups occupying the Y or X position in the average molecule. Mixtures of monomers which result in the formation of a macrophase of sticky polymer must be avoided, since such polymers interfere with agitation and temperature control during polymerization and are not readily soluble upon neutralization.

Examples of monomers having hydrophillic groups are: acrylic acid, methacrylic acid, alpha-ethylacrylic acid, beta-methyl acrylic acid, alpha, beta-dimethylacrylic acid, hydroxyethyl acrylate, acrylamide, methacrylamide, vinyl ethyl ether, vinyl methyl ether, vinyl pyrrolidone, and allyl alcohol.

Monomers having hydrophobic groups are acrylonitrile, or methylacrylonitrile, ethylacrylonitrile, methyl acrylate, ethyl acrylate, methyl methacrylate, ethyl methacrylate, hydroxyethyl acrylate, hydroxypropyl acrylate, methoxyethyl acrylate, hydroxyethyl methacrylate, hydroxypropyl methacrylate, vinyl acetate, vinyl propionate, N-isopropylacrylamide, N-ethyl acrylamide, N-methyl acrylamide, N-isooctyl acrylamide, N-methylolacrylamide and diacetone acrylamide.

Generally, the oligomerization temperature is maintained between 5° and 90°C., preferably 20° and 65°C. This may be readily determined depending on the particular reaction.

The oligomerization is carried out in water in the presence of a relatively large amount of the bisulfite reducing initiator. Generally, the amount of reducing initiator, expressed as moles of monomer/gram formula weights (gFW) of reducing initiator, is between 4 and 250, but preferably this value ranges between 10 and 100. The ratio of moles of monomer to the gFW of the reducing initiator determines the degree of oligomerization. Using the reaction product viscosity as an indication of the molecular weight, the effect of the relative amount of the reductive initiator is shown in the following table:

Table 1

Effect of $NaHSO_3$ on the Viscosity of Polyacrylic Acid

| Moles Acrylic Acid gFW $NaHSO_3$ | Viscosity Relative to Water of 10% Reaction Product |
|---|---|
| 20 | 1.86 |
| 40 | 3.38 |
| 60 | 3.86 |

With regard to the reductive initiator, the preferred materials are the water soluble bisulfite salts, particularly, sodium or potassium, but other bisulfite salts may be used, e.g., lithium, cesium, rubidium, ammonium, monomethyl ammonium, or monoethanol ammonium.

In practice, enough oxidative activator is used to effect 100 percent conversion of the monomers to oligomer. The amount of such activator, expressed as gFW activator/gFW initiator may range from 0.0001 to 0.5, but usually is based within the limits of 0.001 to 0.1. Examples of these oxidative activators are ammonium persulfate, sodium persulfate, potassium persulfate, and hydrogen peroxide; but other water soluble oxidants, which are known to the practitioners of polymerization, may be used.

The products of the reductive polymerization of the invention have a comparatively low molecular weight and form aqueous solutions of low viscosity. The molecular weight of the compounds is generally less than 25,000, most desirably, from 500 to 4,000. The viscosity for these materials, in a 10 percent aqueous solution, is often less than 500 cps at 22°C., frequently from 1.5 to 100 cps at 22°C. The aqueous solutions may be neutralized with commonly known hydroxides, e.g., NaOH, oxides, carbonates or free bases, e.g., $NH_3$, if acid groups occupy the X or Y position of the average molecule, shown above. These salt solutions of the oligomers also have low viscosity and are useful compositions.

Because the oligomers of the invention and their salts are conductive, they are useful as conductive agents. This use is described in the patent application of Anthony Ferro, entitled, "Conductive Coatings", filed simultaneously herewith U.S. Ser. No. 43,655, filed May 1, 1970, which is a division of U.S. Ser. No. 679,956, filed Oct. 12, 1967, and now abandoned. Additionally, the oligomers are useful as surface active agents.

In order to illustrate more clearly the instant invention attention is directed to the following examples:

EXAMPLE I

A typical laboratory preparation of a preferred oligomer of the invention is done in a one-quart reactor which is fitted with an agitator, a liquid phase thermometer, a reflux condenser, an additional funnel, and a gas induction tube leading into the vapor phase. This ensemble is in a thermostated bath at 31.8°C.

Into the reactor are placed 3.12 g. $NaHSO_3$ (0.03 gFW), 159.8 g. water, 90.72 g. acrylic acid (1.26 moles), and 12.7 g. acrylonitrile (0.24 moles). The ratio of moles of monomer of gFW $NaHSO_3$ is 50, and the mole fraction of acrylic acid based on all monomers is 0.84. This oligomer may be represented as H-(acrylonitrile)$_8$-(acrylic acid)$_{42}SO_3Na$.

Nitrogen is allowed to flow slowly (ca. 100 cc/min.) into the reactor through the gas induction tube. When the contents of the flask reach 31.4°C., 0.25 ml. 1 percent aqueous $(NH_4)_2S_2O_8$ is added from the addition funnel. The following behavior takes place:

Table 2

| Time after initial addition of $(NH_4)_2S_2O_8$, Min. | Reaction Temperature °C. | ml. 1% Aqueous $(NH_4)_2S_2O_8$ Added |
|---|---|---|
| 8 | 32.0 | 0.25 |
| 14 | 32.4 | 0.25 |
| 32 | 36.8 | none |
| 52 | 35.9 | 0.25 |
| 57 | 37.2 | none |
| 72 | 35.9 | 0.25 |
| 77 | 36.5 | none |

Table 2-Continued

| Time after initial addition of $(NH_4)_2S_2O_8$, Min. | Reaction Temperature °C. | ml. 1% Aqueous $(NH_4)_2S_2O_8$ Added |
|---|---|---|
| 88 | 35.8 | 0.25 |
| 90 | 36.2 | none |
| 97 | 35.8 | 0.25 |
| 102 | 36.0 | none |
| 115 | 34.7 | 0.25 |
| 123 | 34.7 | none |
| 133 | 34.4 | 0.35 |
| 138 | 34.5 | none |
| 162 | 33.6 | 0.50 |
| 187 | 33.5 everything off | Add to total 0.0325 g. $(NH_4)_2S_2O_8$ |

The next morning, the weight of the clear reaction product is 269.2 g. It has 39.2 percent solids which indicates 99.0 percent conversion. Its viscosity is 7,700 cps.

EXAMPLE II

Following the laboratory procedure of Example I, $(NH_4)HSO_3$ is used as the initiator to prepare H-(acrylonitrile)$_{7.5}$ - (acrylic acid)$_{22.5}$ —SO$_3$NH$_4$. $(NH_4)_2S_2O_8$ is again used as the activator. The reaction goes to 95 percent conversion. The 100 percent conversion solids is 34.9 percent. The viscosity is 1,010 cps. as compared to 1,450 cps. for the corresponding oligomer prepared with a NaHSO$_3$ initiator. This is substantially the same.

EXAMPLE III

Oligomers of the invention having the following formulas were prepared using 3.47 grams of NaHSO$_3$ as the initiator and 0.04 grams of $(NH_4)_2S_2O_8$ as the activator per mole of monomers. In all runs the conversion is over 98 percent. The viscosity of an aqueous solution having about 35 percent solids is shown:

Table 3

| Oligomer | Viscosity, Cps. |
|---|---|
| H-(Acrylonitrile)$_{5.5}$ (Acrylamide)$_{2.0}$ (Acrylic Acid)$_{22.5}$—SO$_3$Na | 1800 |
| H-(Acrylamide)$_{7.5}$ (Acrylic acid)$_{22.5}$ SO$_3$Na | 1300 |

These two oligomers show that low viscosity products are obtained when subjected to reductive polymerization.

EXAMPLE IV

This example shows the effect of storage on reaction product viscosity and also on the effect of the initiator action on viscosity. All reactions are over 95 percent conversion and the oligomers are H-(acrylonitrile)$_5$-(acrylic acid)$_{15}$SO$_3$M. The following table shows the results obtained:

Table 4

| Initiator HSO$_3^-$ Cation | Activator $S_2O_8=$ | % Solids at 100% Conversion | Viscosity, cps., as made/after 3 weeks |
|---|---|---|---|
| Sodium | Ammonium | 45% | 3200/2950 |
| Sodium | Ammonium | 50% | 7300/7300 |
| Sodium | Potassium | 50% | 6080/— |
| Sodium | Ammonium | 50% | 3780/— |
| Potassium | Potassium | 45% | 1100/1150 |
| Potassium | Potassium | 50% | 2300/2450 |

The effect of time on viscosity is particularly important, not only because of the handling problems, but also because of the need to maintain constant viscosity for ease of process control. The above table shows that the potassium initiator gave outstandingly low viscosities even at high solids levels and that the viscosity was substantially constant over the 3 week period.

EXAMPLE V

Using the general procedure in Example I, several other oligomers of the invention, of the type described by the general formula, H-(acrylonitrile)$_a$-(acrylic acid)$_b$SO$_3$Na, are prepared. DO (degree of oligomerization), is given by $(a + b)$, but is calculated from moles of monomer/gFW of reducing initiator. In this work DO is varied from 16 to 60, the mole fraction of acrylonitrile, $a/(a + b)$, from 0.500 to 0.0 and the percent solids from 10 to 60 percent.

The effect of these variables on viscosity, expressed in centipoises, is illustrated in the following table:

Table 5

| | | a/(a + b) | | | | |
|---|---|---|---|---|---|---|
| DO | % Solids | 0.500 | 0.333 | 0.250 | 0.167 | 0.000 |
| 16 | 10% | | | | | |
|  | 30% | | | | | |
|  | 35% | | 186 cps. | | | |
|  | 40% | | | | | |
|  | 50–60%* | 100M*cps. | | | | |
|  | 10% | | | | | 1.5 cps. |
| 20 | 30% | | | | | |
|  | 35% | | 2 phase | 296 cps. | 378 cps | |
|  | 40% | | | 3200 cps. | | 150 cps. |
|  | 50–60%* | | | 7300 cps. | | |
|  | 10% | | | | | |
| 30 | 30% | | | | | |
|  | 35% | | 2 phase | 1450 cps. | 1120 cps. | |
|  | 40% | | | | | |
|  | 50–60%* | | | | | |
|  | 10% | | | 2 phase | | 2.7 cps. |
| 40 | 30% | | | 2 phase | | |
|  | 35% | | 7500 cps. | 9600 cps. | 4000 cps. | |
|  | 40% | | | | | |

Table 5 — Continued

| DO | % Solids | a/(a + b) | | | | |
|---|---|---|---|---|---|---|
| | | 0.500 | 0.333 | 0.250 | 0.167 | 0.000 |
| 50 | 50–60%* | | | | | |
| | 10% | | | | | |
| | 30% | | | 2 phase | | |
| | 35% | | | 2 phase | 7700 cps. | |
| | 40% | | | 30M cps. | 12M cps. | |
| | 50–60%* | | | 40, cps. | | |
| | 10% | | | 2 phase | | 3.1 cps. |
| 60 | 30% | | | | | |
| | 35% | | | | | 30M cps. |
| | 40% | | | | | |
| | 50–60%* | | | | | |

*50% Solids are unmarked, while 60% Solids are marked.

Where two phases formed neither conversion nor viscosity was determined. The above data show the low viscosity is achieved particularly at $a/(a + b)$ ratios under 0.250 and at DO's of 30 or less. It should be further noted, however, that low viscosities at low solids contents, e.g., 10 percent, could be obtained even where the DO was 60.

It is readily apparent that the viscosity of the reaction product is markedly lower where the reductive polymerization of the invention is employed. This evidences more exacting molecular weight regulation.

EXAMPLE VI

This example describes the preparation of, H-(acrylonitrile)$_{10}$-(acrylic acid)$_{30}$—SO$_3$Na and its potassium salt in which almost all of the acrylic acid groups are neutralized with potassium hydroxide. A 1 gallon reactor fitted in a like manner to the quart reactor of Example I is charged with 1707 g. water, 265 g. acrylonitrile, 1080 g. acrylic acid, and 52 g. NaHSO$_3$. The reactor is placed in a water bath thermostated at 29.8°C. and a nitrogen stream flows through the vapor phase of the reactor. The initiator, 1 g. (NH$_4$)$_2$S$_2$O$_8$ in 68 g. water, is added slowly so that 10 g. of the solution are in the reactor after 4 hours. The temperature of the reactants rises to 41°C. The reaction stands overnight and has 44.9 percent solids and a viscosity of 74,000 cps. 33 percent Aqueous KOH solution is added to the reaction product in quantity sufficient to neutralize 95 percent of the acrylic acid present. This salt solution is without haze or tint, has 37.8 percent solids, 1300 cps. viscosity and 6.5 pH.

EXAMPLE VII

Using the procedure described in the previous example, except the oligomer H-(acrylonitrile)$_5$-(acrylic acid)$_{15}$—SO$_3$Na is prepared. The reaction product has 44.6 percent solids, and 4950 cps. viscosity and is clear and colorless. When enough 33 percent aqueous KOH to neutralize 95 percent of the acrylic acid is added to this reaction product, a salt solution of the oligomer is obtained. This is clear and colorless, has 37 percent solids, 230 cps. viscosity and 6.4 pH.

EXAMPLE VIII

This example demonstrates how the value of $a/(a + b)$ affects the utility of the reductive polymerization in water when a is a less polar group. The oligomers of this example may be represented by, H-(methyl acrylate)$_a$-(acrylic acid)$_b$—SO$_3$Na, and they are prepared as in Example I with appropriate changes in amounts of monomers and NaHSO$_3$ to describe the particular oligomer. Enough water is used to have about 45 percent solids at 100 percent conversion of the reactants. The following table shows that the value of $a/(a + b)$ must be less than 0.4 to avoid the formation of a macro phase of polymer.

Table 6

| Run No. | a | b | a/(a+b) | % Conversion | Viscosity of Product |
|---|---|---|---|---|---|
| 1. | 4 | 16 | 0.2 | 98.3% | 1970 cps. |
| 2. | 6 | 14 | 0.3 | 98.2 | 2075 cps. |
| 3. | 8 | 12 | 0.4 | (Macro Phase of Polymer) | |
| 4. | 10 | 10 | 0.5 | (Macro Phase of Polymer) | |

The macro phase of polymer stops the agitation, is difficult to remove from the reactor, and is for these reasons not a useful product.

EXAMPLE IX

The preparation of, H-(N-isooctyl acrylamide)$_1$-(acrylic acid)$_{20}$—SO$_3$Na is conducted in a 1-liter resin flask which is fitted with a nitrogen inlet, reflux condenser, thermometer, agitator and an addition funnel. The flask is in a water bath thermostated as 58°C. The flask charge is 7.8 g. NaHSO$_3$ and 369.2 g. water. The addition funnel contains a homogeneous solution of 12.23 g. N-isooctyl acrylamide in 108 g. acrylic acid. The activator solution consists of 7 g. (NH$_4$)$_2$S$_2$O$_8$ in 50 g. water. When the flask charge has reached 58°C., all but 45.1 g. of the mixed monomers is run into the flask and simultaneously, 0.33 g. of the activator solution is added. The reactant temperature rises to 81°C. and falls to bath temperature in 20 minutes. The rest of the mixed monomers is then added, but no exotherm takes place until 2.3 g. NaHSO$_3$ in 10 g. water and 0.33 g. of activator solution is added, when the reactant temperature rises to 67°C. Further addition of activator solution (2 g.) produced no exotherm. The reaction product has 31 percent solids indicating 100 percent conversion. Its viscosity is 220 cps. and it has a milky appearance.

EXAMPLE X

The preparation of, H-(hydroxyethyl acrylate)$_{10}$-(acrylic acid)$_{10}$—SO$_3$Na is conducted in apparatus described in Example I, except that the bath is thermostated at 48.2°C. The charge consists of 10.4 g. NaHSO$_3$, 368.4 g. water, 72 g. acrylic acid and 116 g. hydroxyethyl acrylate. Addition of 0.8 g. 1 percent aqueous $(NH_4)_2S_2O_8$ during 1 hour produces an exotherm to 56°C. During the next 40 minutes 1.4 g. 20 percent aqueous $(NH_4)_2S_2O_8$ are added and produce an exotherm to 80°C. followed by a return to bath temperature. The reaction product has 34.3 percent solids and this indicates 98 percent conversion. The viscosity of the clear solution is 370 cps.

EXAMPLE XI

The preparation of, H-(ethyl acrylate)$_4$-(acrylic acid)$_{16}$—SO$_3$Na and its ammonium salt is conducted in apparatus described in Example I. The water bath is thermostated at 29.5°C. The charge is 13 g. NaHSO$_3$, 144 g. acrylic acid, 50 g. ethyl acrylate, and 253 g. water. The addition of 1.6 g. 20 percent aqueous $(NH_4)_2S_2O_8$ over a period of 2 hours produces an exotherm to 37°C. The reaction product shows 98 percent conversion, and 1600 cps. viscosity. It is a hazy solution. 54.8 G. of this reaction product plus 14.4 g. 28% NH$_3$ produces a clear solution of the ammonium salt of this oligomer.

EXAMPLE XII

The preparation of, H-(hydroxypropyl acrylate)$_5$-(acrylic acid)$_{15}$—SO$_3$Na and its ammonium salt is conducted in apparatus described in Example I. The water bath is thermostated at 50.0°C. The charge consists of 10.4 g. NaHSO$_3$, 108 g. acrylic acid, 65 g. hydroxypropyl acrylate and 340.6 g. water. The addition of 1.6 g. 1 percent aqueous $(NH_4)_2S_2O_8$ during 2 hours and 40 minutes produces an exotherm to 58°C. Subsequent addition of 2 g. 20 percent aqueous $(NH_4)_2S_2O_8$ during 2 hours, produces a slight exotherm then none. The reaction product shows 1560 cps. viscosity, 99 percent conversion and is slightly hazy. When neutralized with concentrated NH$_3$, the resulting salt solution is clear.

EXAMPLE XIII

The preparation of, H -(methoxyethyl acrylate)$_5$-(acrylic acid)$_{15}$—SO$_3$Na is conducted in apparatus described in Example I. The bath is thermostated at 50.0°C. The charge consists of 10.4 g. NaHSO$_3$, 108 g. acrylic acid, 65 g. methoxyethyl acrylate, and 340.6 g. water. The addition of 1.8 g. 1 percent aqueous $(NH_4)_2S_2O_8$ during 1 hour produces an exotherm to 70°C. Subsequent addition of 1.2 g. 20 percent aqueous $(NH_4)_2S_2O_8$ during 30 minutes produces an exotherm to 54°C. and then nothing. The reaction product stands overnight and separates into two liquid phases. The addition of enough concentrated NH$_3$ to neutralize the acrylic acid present produces a one phase solution of the salt.

Having thus described my invention, what I claim and desire to protect by letters patent is:

1. A water soluble oligomer having the formula:

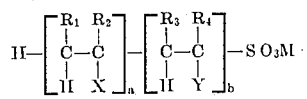

wherein M is a water soluble cation of a bisulfite salt; R$_1$, R$_2$, R$_3$ and R$_4$ are the same or different, and are selected from the group consisting of hydrogen, methyl and ethyl; Y is at least one hydrophilic group selected from the group consisting of —COOH, —CONH$_2$, —OCH$_3$, —OC$_2$H$_5$, and —CH$_2$OH; X is at least one hydrophobic group selected from the group consisting of —COOR$_5$OH, —CONHR$_5$OH, —CONHR, —COOR, —OOCR, —COOR$_5$OR and —CONHR$_5$COR wherein R is an alkyl group containing 1 to 8 carbon atoms and R$_5$ is an alkylene group containing 1 to 4 carbon atoms; $a+b$ is from 20 to 100 ; and $a/a+b$ is greater than zero, but not greater than 0.6.

2. The oligomer of claim 1 wherein the oligomer contains one kind of Y group and one kind of X group.

3. The oligomer of claim 2 wherein the Y group is —COOH.

4. The oligomer of claim 1 wherein R$_1$, R$_2$, R$_3$ and R$_4$ are hydrogen.

5. The oligomer of claim 1 wherein M is an alkali metal, ammonium of amine salt.

* * * * *

UNITED STATES PATENT AND TRADEMARK OFFICE
CERTIFICATE OF CORRECTION

PATENT NO. : 3,859,260
DATED : January 7, 1975
INVENTOR(S) : Leland E. Dannals

It is certified that error appears in the above–identified patent and that said Letters Patent are hereby corrected as shown below:

Add to cover sheet:

[73] Assignee: Uniroyal, Inc., New York, N.Y.

Signed and Sealed this twenty-eight Day of October 1975

[SEAL]

Attest:

RUTH C. MASON
*Attesting Officer*

C. MARSHALL DANN
*Commissioner of Patents and Trademarks*